US006933920B2

(12) United States Patent
Lacroix et al.

(10) Patent No.: US 6,933,920 B2
(45) Date of Patent: Aug. 23, 2005

(54) DATA FILTER FOR HAPTIC FEEDBACK DEVICES HAVING LOW-BANDWIDTH COMMUNICATION LINKS

(75) Inventors: Robert Lacroix, Montreal (CA); Adam C. Braun, Portland, OR (US)

(73) Assignee: Immersion Corporation, San Jose, CA (US)

( * ) Notice: Subject to any disclaimer, the term of this patent is extended or adjusted under 35 U.S.C. 154(b) by 472 days.

(21) Appl. No.: 10/254,340

(22) Filed: Sep. 24, 2002

(65) Prior Publication Data

US 2003/0058216 A1 Mar. 27, 2003

Related U.S. Application Data

(60) Provisional application No. 60/324,750, filed on Sep. 24, 2001.

(51) Int. Cl.[7] .................................................. G09G 5/00
(52) U.S. Cl. ........................ 345/156; 345/701; 345/702
(58) Field of Search ................................. 345/700–702, 345/156

(56) References Cited

U.S. PATENT DOCUMENTS

| 2,972,140 A | 2/1961 | Hirsch |
| 3,157,853 A | 11/1964 | Hirsch |
| 3,220,121 A | 11/1965 | Cutler |

(Continued)

FOREIGN PATENT DOCUMENTS

| EP | 0349086 | 1/1990 |
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

"Taking a Joystick Ride", Computer Currents, Tim Scannell, Nov. 1994, Boston Edition, vol. 9 No. 11.
"Coaxial Control Shaker Part No. C–25502," Safe Flight Instrument Corporation, 26 pages, Jul. 1, 1987; Revised Jan. 28, 2002.
PCT US02/30390, International Search Report mailed Dec. 12, 2002.
Baigrie, "Electric Control Loading—A Low Cost, High Performance Alternative," Proceedings, pp. 247–254, Nov. 6–8, 1990.
Iwata, "Pen–based Haptic Virtual Environment," 0–7803–1363–1/93 IEEE, pp. 287–292, 1993.
Russo, "The Design and Implementation of a Three Degree of Freedom Force Output Joystick," MIT Libraries Archives Aug. 14, 1990, pp. 1–131, May 1990.
Brooks et al., "Hand Controllers for Teleoperation—A State–of the Art Technology Survey and Evaluation," JPL Publication 85–11; NASA–CR–175890; N85–28559, pp. 1–84 Mar. 1, 1985.
Jones et al., "A perceptual analysis of stiffness," ISSN 0014–4819 Springer International (Springer–Verlag); Experimental Brain Research, vol. 79, No. 1, pp. 150–156, 1990.

(Continued)

*Primary Examiner*—Sumati Lefkowitz
*Assistant Examiner*—Motilewa Good-Johnson
(74) *Attorney, Agent, or Firm*—Kilpatrick Stockton LLP

(57) ABSTRACT

Embodiments of the present invention provide computer program products, methods, and systems for use with low speed processors and/or low-bandwidth communication links. Embodiments of the present invention allows low-bandwidth communication links to proceed at a level similar to a high-bandwidth communication link by filtering data that the filter deems contains substantially identical haptic feedback parameters as a previously transmitted data.

30 Claims, 4 Drawing Sheets

U.S. PATENT DOCUMENTS

| | | |
|---|---|---|
| 3,497,668 A | 2/1970 | Hirsch |
| 3,517,446 A | 6/1970 | Corlyon et al. |
| 3,623,064 A | 11/1971 | Scourtes |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Frosch et al. |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,794,392 A | 12/1988 | Selinko |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond |
| 5,165,897 A | 11/1992 | Johnson |
| 5,175,459 A | 12/1992 | Danial et al. |
| 5,186,695 A | 2/1993 | Mangseth et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,299,810 A | 4/1994 | Pierce et al. |
| 5,309,140 A | 5/1994 | Everett, Jr. et al. |
| 5,334,027 A | 8/1994 | Wherlock |
| 5,436,622 A | 7/1995 | Gutman et al. |
| 5,437,607 A | 8/1995 | Taylor |
| 5,466,213 A | 11/1995 | Hogan et al. |
| 5,547,382 A | 8/1996 | Yamasaki et al. |
| 5,575,761 A | 11/1996 | Hajianpour |
| 5,690,582 A | 11/1997 | Ulrich et al. |
| 5,766,016 A | 6/1998 | Sinclair et al. |
| 5,785,630 A | 7/1998 | Bobick et al. |
| 6,111,577 A | 8/2000 | Zilles et al. |
| 6,144,884 A | 11/2000 | Niemeyer et al. |
| 6,160,489 A | 12/2000 | Perry et al. |
| 6,411,276 B1 | 6/2002 | Braun et al. |
| 6,422,941 B1 | 7/2002 | Thorner et al. |
| 6,529,183 B1 * | 3/2003 | MacLean et al. ........... 345/156 |
| 6,801,187 B2 * | 10/2004 | Stewart et al. .............. 345/156 |
| 2003/0058216 A1 * | 3/2003 | Lacroix et al. ............. 345/136 |

OTHER PUBLICATIONS

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, p. 1–369, 1990.

Tadros, Control System Design for a Three Degree of Freedom Virtual Environment Simulator Using Motor/Brake Pair Actuators, MIT Archive © Massachusetts Institute of Technology, pp. 1–88, Feb. 1990.

Caldwell et al., "Enhanced Tactile Feedback (Tele–Taction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of a Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy et al., "Generalization of Bilateral Force–Reflecting Control of Manipulators," Proceedings Of Fourth CISM–IFToMM, Sep. 8–12, 1981.

McAffee et al., "Teleoperator Subsystem/Telerobot Demonstrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and deaf–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contractor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young et al., "A Low–Cost Force Feedback Joystick and Its Use in PC Video Games," IEEE Transactions on Consumer Electronics, vol. 41, No. 3, Aug. 1995.

Marcus, "Tough Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Patrick et al., "Design, Construction, and Testing of a Fingertip, Tactile Display for Interaction with Virtual and Remote Environments," Master of Science Thesis, MIT, Nov. 8, 1990.

Cadler, "Design of A Force–Feedback Touch–Introducing Actuator For Teleoperator Robot Control," Bachelor of Science Thesis, MIT, Jun. 23, 1983.

Wiker, "Teletouch Display Development: Phase 1 Report," Technical Report 1230, Naval Ocean Systems Center, San Diego, Apr. 17, 1989.

Bliss, "Optical–to–Tactile Image Conversion for the Blind," IEEE Transactions on Man–Machine Systems, vol. MMS–11, No. 1, Mar. 1970.

Johnson, "Shape–Memory Alloy Tactile Feedback Actuator," Armstrong Aerospace Medical Research Laboratory, AAMRL–TR–90–039, Aug., 1990.

Kontarinis et al., "Tactile Display of Vibratory Information in Teleoperation and Virtual Environments," Presence, 4(4): 387–402, 1995.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: Vol. 1, ASME 1994.

Gobel et al., "Tactile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Edition: McGraw–Hill, ISBN 0–07–050167–X, pp. 41–202, 1994.

"Cyberman Technical Specification", Logitech Cyberman Swift Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

Lake, "Cyberman from Logitech," Gamebytes, 1994.

Yamakita et al., "Tele–Virtual Reality of Dynamic Mechanical Model," Proceedings of the 1992 IEEE/RSJ International Conference on Intelligent Robots and Systems, Raleigh, NC, Jul. 7–10, 1992.

Noll, "Man–Machine Tactile," SID Journal, Jul./Aug. 1972 Issue.

Rosenberg, "Virtual Fixtures: Perceptual Overlays Enhance Operator Performance In Telepresence Tasks," Ph.D. Dissertation, Stanford University, Jun. 1994.

\* cited by examiner

DATA FILTER FOR HAPTIC FEEDBACK DEVICES HAVING LOW-BANDWIDTH COMMUNICATION LINKS

CROSS-REFERENCES TO RELATED APPLICATIONS

The present application claims benefit to U.S. Provisional Patent Application Ser. No. 60/324,750, filed Sep. 24, 2001 and entitled "Data Filter for Haptic Feedback Devices Having Low Bandwidth Communication Links," the complete disclosure of which is incorporated herein by reference.

BACKGROUND OF THE INVENTION

Embodiments of the present invention relate generally to haptic feedback interface devices used with a host computer system, and more particularly to data filters for haptic feedback interface devices.

Common human-computer interface devices used for interaction with a computer system or electronic device include a mouse, joystick, trackball, gamepad, steering wheel, stylus, tablet, pressure-sensitive sphere, knob, or the like. In some haptic feedback interface devices, kinesthetic force feedback and/or tactile feedback are also provided to the user, more generally known collectively herein as "haptic feedback." These types of interface devices can provide physical sensations that are felt by the user manipulating a manipulandum of the interface device, such as a joystick handle, mouse button, knob, etc., the interface device's housing, or other element of the interface device in haptic contact with the user. One or more motors or other actuators can be coupled to the interface device housing or manipulandum and are in communication with a controlling host computer system. The host computer system controls forces and/or resistance on the manipulandum and/or housing in conjunction and coordinated with events and interactions by sending control signals or commands to the actuators of the interface device.

Most haptic feedback applications rely on a high-bandwidth communication link between the haptic feedback interface device and the host computer system. For example, a full-speed Universal Serial Bus (USB) Human Interface Device (HID) class device generally has a bandwidth of up to 64 kbytes/sec., which is more than sufficient for many haptic applications. In low speed USB devices which have cheaper controllers, however, the communication link may have less bandwidth.

In existing software applications, the haptic feedback data created by the application program gets transferred through the driver software to the haptic feedback interface device. When a haptic feedback application program requiring high-bandwidth communications is used to interface with a lower-bandwidth haptic feedback interface device, a communication bottleneck is often created and the application spends more time waiting for each data to complete its transmission, thereby slowing down the application's overall performance. Data get queued and the queue grows, in some instances causing a system halt or crash when the queue count grows too large. In other instances, the outgoing pipe may get filled up and never empty.

The application program's displayed frame rate (or update rate) and/or overall performance may suffer due to the program's inability to cope with the low-bandwidth communications link. Inefficiencies, poor haptic effects, or lost data can also occur in implementations having high bandwidth but low processing power on the haptic feedback interface device, e.g., the data is received at too great a rate for a processor or circuit on the device to handle properly.

BRIEF SUMMARY OF THE INVENTION

In one embodiment, the present invention provides computer program products, systems, and methods for filtering data. Embodiments comprise transmitting a first data before transmitting a second data from a host computer system to a haptic feedback interface device. It is determined whether the second data contains substantially identical haptic feedback parameters as the first data. The second data is filtered based on the determination that the second data has substantially identical haptic feedback parameters as the first data.

In another embodiment, the present invention provides computer program products, systems, and methods that are configured to filter data based on an amount of data in a transmission queue between a host computer system and a haptic feedback interface device. Exemplary embodiments of the present invention can monitor the amount of data in a transmission queue to a haptic feedback interface device from a host computer system. If the number of messages in the transmission queue is below a threshold level, some or all of the messages are allowed to be transmitted to the haptic feedback interface device. If, however, the amount of data in the transmission queue is above the threshold level, data that provides substantially identical haptic feedback parameters or does not significantly change the haptic feedback output to the user, may be filtered before being transmitted to the haptic feedback interface device.

A further understanding of the nature and advantages of the invention will become apparent by reference to the remaining portions of the specification and drawings.

DETAILED DESCRIPTION OF THE INVENTION

Figure 1:
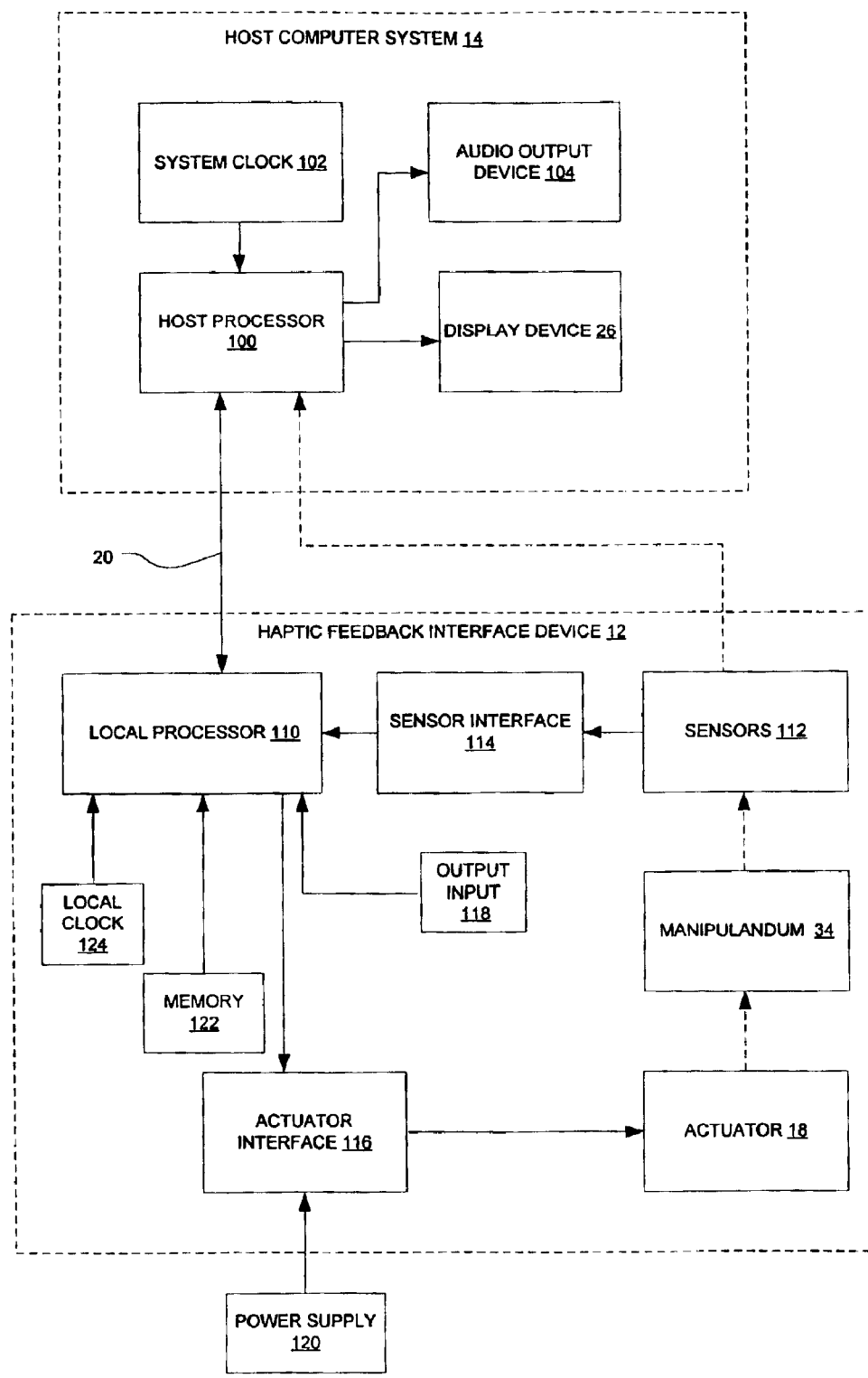
FIG. 1 schematically illustrates a haptic feedback system suitable for use with the embodiments of the present invention.

FIG. 1 is a block diagram illustrating a haptic feedback system suitable for use with the described embodiments of the present invention. The haptic feedback system includes a host computer system 14 and haptic feedback interface device 12 and a data filter that is processed by one of the host computer system 14 and haptic feedback interface device 12.

Host computer system 14 can include one or more host processors 100, a system clock 102 and, a display device 26 and might include an audio output device 104. Host computer system 14 may also include other well known components, such as, but not limited to, a bus, random access memory (RAM), read-only memory (ROM), and input/output (I/O) electronics (not shown), or the like.

Host computer system 14 can be any device with one or more processors. Examples include, but are not limited to, a personal computer or workstation operating under any well-known operating system, one of a variety of home video game console systems commonly connected to a television set or other display, such as systems available from Nintendo, Sega, Sony, or Microsoft, a "set top box," a "network" or "internet-computer" that allows users to interact with a local or global network using standard connections and protocols, such as used for the Internet and World Wide Web, an appliance or electronic device, vehicle computer, arcade game, portable computer, etc.

In one embodiment, host computer system 14 can implement a host application program that interacts with haptic feedback interface device 12. Haptic feedback interface device 12 can be any device with haptic feedback functionality. Examples include, but are not limited to a mouse, a joystick, trackball, gamepad, steering wheel, stylus, tablet, pressure-sensitive sphere, knob, or the like. Examples of host application programs include, but are not limited to, video games, word processors, spreadsheets, Web pages or browsers that implement HTML or VRML instructions, scientific analysis programs, virtual reality training programs or applications, operating systems or other application programs. Herein, host computer system 14 may be referred to as providing a "graphical environment," that can be a graphical user interface, game, simulation, or other visual environment, and might include graphical objects, that are displayed by display device 26. Typically, an Application Programming Interface (API) is used to interface the application programs that lower level driver programs that communicate directly with haptic feedback interface device 12.

In one embodiment, display device 26 can be coupled to host computer system 14 and can be, for example, but not the only example, a standard display screen (LCD, CRT, flat panel, etc.), 3-D goggles, or any other conventional or proprietary visual output device. The host application can provide images to be displayed in a graphical environment on display device 26 and/or other feedback, such as auditory signals. Audio output device 104, such as a set of speakers, can be coupled to host processor(s) 100 via amplifiers, filters, and other circuitry known to those skilled in the art and provides sound output to user when an "audio event" occurs during the operation of the host application program. Other types of peripherals can also be coupled to host processor(s) 100, such as storage devices (hard disk drive, CD ROM drive, floppy disk drive, CD-R, CD-RW, DVD, DVD-R, etc.), printers, and other input and output devices.

In one embodiment, haptic feedback interface device 12 can be a gamepad, mouse, joystick, steering wheel, stylus, touchpad, spherical controller, finger pad, knob, track ball, a hand-held remote control device used to select functions of a television, video cassette recorder, sound stereo, internet or network computer, a cellular phone, personal digital assistant, or any device that can provide haptic forces to a user.

In one embodiment, haptic feedback interface device 12 can include a housing (not shown) and a manipulandum 34, such as, but not limited to, a joystick handle, a mouse, a knob, a steering wheel, a trackball, button, a trigger, a foot pedal, etc. The manipulandum 34 can be moved by the user and tracked by sensors. The forces from the actuator(s) 18 can be applied to the housing of haptic feedback interface device 12 and/or the movable manipulandum 34.

In one embodiment, haptic feedback interface device 12 is coupled to the host computer system 14 in any way known in the art to enable data transfer, either uni-directional, bi-direction, or both, between host computer system 14 and haptic feedback interface device 12. For example, but not the only example, host computer system 14 and haptic feedback interface device 12 can be coupled by a communication link (such as a bus) 20, that communicates signals between haptic feedback interface device 12 and host computer system 14 and may also, in some embodiments, provide power to haptic feedback interface device 12. In other embodiments, signals can be sent between haptic feedback interface device 12 and host computer system 14 by wireless transmission/reception. Some examples of the communication link 20 include, but are not limited to a serial interface bus, such as Universal Serial Bus (USB), RS232 serial interface, RS-422, MIDI, or any bus according to protocols known to those skilled in the art; or a parallel bus or wireless link.

Haptic feedback interface device 12 can include one or more local processors 110. Local processor 110 can optionally be included inside or outside the housing of haptic feedback interface device 12 to allow efficient communication with other components of the haptic feedback interface device. Local processor 110 is considered local to haptic feedback interface device 12, where "local" herein refers to local processor 110 being a separate processor from any processors in host computer system 14. In one embodiment, processor 110 can include instructions to wait for commands or requests from host computer system 14, decode the commands or requests, and handle/control input and output signals according to the commands or requests. In addition, local processor 110 can operate independently of host computer system 14 by reading sensor signals and calculating appropriate forces from those sensor signals, time signals, and stored or relayed instructions selected in accordance with a host command. Some examples of suitable processors for use as local processor 110 include, but are not limited to, lower-end processors as well as more sophisticated force feedback processors such as the ST7 processor from STMicroelectronics and the Immersion Touchsense™ Processor, manufactured by Immersion Corporation of San Jose, Calif. Local processor 110 can include one microprocessor chip, multiple processors and/or co-processor chips, and/or digital signal processing (DSP) capability.

Local processor 110 can receive signals from sensor 112 via a sensor interface 114 and provide signals to actuator 18 via an actuator interface 116 in accordance with instructions provided by host computer system 14 over communication link 20. For example, in a local control embodiment, host computer system 14 can provide high level supervisory commands to local processor 110 over communication link 20, and local processor 110 can decode the commands and manages low level force control loops to sensors and the actuator in accordance with the high level commands, independently of host computer system 14. This operation is described in greater detail in U.S. Pat. Nos. 5,739,811 and 5,734,373. Local processor 110 may also use sensor signals in the local determination of forces to be output on the user object, as well as reporting locative data derived from the sensor signals to host computer system 14.

Herein, the term "haptic sensation" refers to either a single force or a sequence of forces output by an actuator to provide one or more haptic sensation to the user. For example, resistance, vibrations, a single jolt, or a texture sensation are all considered haptic sensations. In some embodiments, local processor 110 can process one or more inputted sensor signals to determine appropriate output actuator signals by following stored code instructions in a memory 122. Herein, memory 122 includes, but is not limited to, RAM, ROM, CDROM, DVD, hard drives, magnetic tapes, or any data storage medium, magnetic, optical, or otherwise.

In yet other embodiments, other hardware can be provided locally to haptic feedback interface device 12 to provide functionality similar to local processor 110. For example, a hardware state machine or ASIC incorporating fixed logic can be used to provide signals to actuator 18 and receive sensor signals from sensors 112, and to output haptic signals.

In another embodiment, host computer system 14 can provide low-level force commands that are transmitted to the actuator 18 via local processor 110 or other circuitry. Host computer system 14 thus control and process signals to and from haptic feedback interface device 12. Other embodiments may employ a "hybrid" organization where some types of forces (e.g., closed loop effects) are controlled partially or entirely by local processor 110, while other types of effects (e.g., open loop effects) may be controlled partially or entirely by the host computer system 14.

In one embodiment, local memory 122 can be coupled to local processor(s) 110 in haptic feedback interface device 12 to store instructions that includes one or more code modules for local processor 110, one or more force feedback effects, temporary data, and other data. In addition, a local clock 124 can be coupled to local processor 110 to provide timing data, similar to system clock 102 of host computer system 14.

In one embodiment, sensors 112 can sense the position or motion of the haptic feedback interface device (e.g. the housing or a manipulandum 34) in a plurality of degrees of freedom and provide signals to local processor 110 (or host computer system 14) including information representative of the position or motion. Sensors 112 suitable for detecting motion include, but are not limited to, digital optical encoders, other optical sensor systems, linear optical encoders, potentiometers, optical sensors, velocity sensors, acceleration sensors, strain gauge, or other types of sensors can also be used, and either relative or absolute sensors can be used. Optional sensor interface 114 can be used to convert sensor signals to signals that can be interpreted by local processor 110 and/or host computer system 14, as is well known to those skilled in the art.

In one embodiment, actuator(s) 18 can transmit(s) forces to the housing, manipulandum, buttons, and/or other portion of haptic feedback interface device 12 in response to signals received from local processor 110 and/or host computer system 14. Haptic feedback interface device 12 can include one or more actuators that are operative to produce forces on haptic feedback interface device 12 (or a component thereof) and haptic sensations to the user. The actuator(s) are "computer-controlled", i.e., the force output from the actuators can be ultimately controlled by signals originating from a controller such as a processor, ASIC, etc. The embodiments of the present invention can be used with any known active actuators such as, but not limited to, DC motors, voice coil actuators, moving magnet actuators, pneumatic/hydraulic actuators, solenoids, speaker voice coils, piezoelectric actuators, or passive actuators, such as brakes. Actuator interface 116 can optionally be connected between actuator 18 and local processor 110 to convert signals from local processor 110 into signals appropriate to control actuator 18. Interface 116 can include power amplifiers, switches, digital to analog controllers (DACs), analog to digital controllers (ADCs), and other components, as is well known to those skilled in the art.

Other input devices 118 can be included in haptic feedback interface device 12 and send input signals to local processor 110 or to host 14 when manipulated by the user. Such input devices include, but are not limited to, buttons, dials, switches, scroll wheels, knobs, or other controls or mechanisms. Power supply 120 can optionally be included in haptic feedback interface device 12 coupled to actuator interface 116 and/or actuator 18 to provide electrical power to the actuator, or be provided as a separate component. Alternatively, power can be drawn from a power supply separate from haptic feedback interface device 12, or power can be received across communication link 20. Also, received power can be stored and regulated by haptic feedback interface device 12 and thus used when needed to drive actuator 18 or used in a supplementary fashion. In some embodiments, the power for actuator 18 on haptic feedback interface device 12 can be supplemented or solely supplied by a power storage device provided on haptic feedback interface device 12, such as a capacitor or one or more batteries (not shown).

Embodiments of the present invention can include a filter that provides additional intelligence in the driver level (or other level) of software running on the host computer system or stored in a memory of the haptic feedback interface device that allows low-bandwidth communications to achieve a similar haptic performance to high-bandwidth communications by controlling and filtering the data flow between the processors of the host computer system and/or between the host computer system and the haptic feedback interface device.

In one embodiment, the filters and code modules of the present invention can filter the communication rate to allow a local processor on the haptic feedback interface device to handle the communication flow from the host processor(s), without sacrificing the quality of the haptic feedback experienced by the user. This can be achieved, for example, using a data filter that understands the functionality of the haptic feedback interface device and can partially filter, completely drop, throw away, discard, or otherwise filter predetermined messages or messages that the filter determines contains substantially identical haptic parameters as a previous data message or will not significantly change the user's perception of the haptic sensations or haptic feedback experience. As such, each of the haptic feedback effects that are currently delivered to the manipulandum and housing will be continued until haptic feedback data that significantly change the user's perception of the current haptic sensations is transmitted to the haptic feedback interface device.

The filtering methods described herein can be implemented by hardware modules, a computer program product that has software code modules stored on a computer readable medium, such as RAM, ROM, optical disk (CD-ROM or DVD-ROM), magnetic hard disk, floppy disk, PCMCIA card, hard drives, magnetic tapes, or combinations thereof. For example, embodiments described herein may employ low-level driver software to implement the method, since at this level the software knows how the data packets are queued and sent to a haptic feedback interface device and the data messages can be received from an application program, API, higher level driver, or other higher level of software running on the host computer system. In other embodiments, methods can be implemented at higher levels of software in the host computer system (API, application program, etc.) The embodiments of the filtering method can be processed in, but not limited to, one or more host processors, a local processor in the haptic feedback interface device, or another processor (not shown) that is independent of the host computer system or the haptic feedback interface device.

Figure 2:
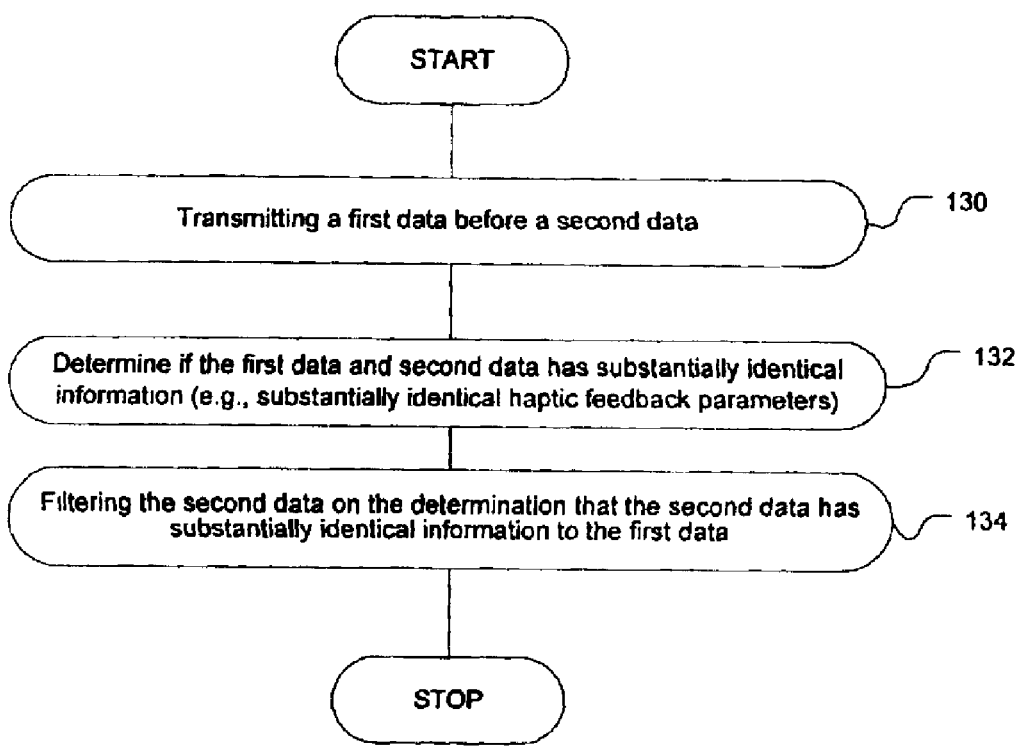
FIG. 2 is a flow diagram illustrating a method for filtering messages according to an embodiment of the present invention.

FIG. 2 is a flow diagram illustrating a method for filtering messages according to one embodiment of the present invention. At 130, a first data is transmitted before a second data. In some embodiments, the first data and second data include haptic feedback parameters (which can include a command or other information). At 132, the filter determines whether the second data contains substantially identical haptic feedback parameters as the first data. At 134, the second data is filtered on the determination that the second data has substantially identical haptic feedback parameters as the first data.

Embodiments of the filters can filter the data in a number of ways. For example, the second data can be completely filtered and prevented from being transmitted to the haptic feedback interface device. In such embodiments, the data will be dropped and not placed in the queue to the haptic feedback interface device. Alternatively, the filters may partially filter the data by filtering redundant portions of the data and allowing non-redundant data to be transmitted to the haptic feedback interface device.

Generally, haptic communication is handled using complete data messages that carry all other data for an effect (or a specific component of a haptic effect). Thus, all of the data is transferred and processed at once. If the communication speed is restricted, however, then it may be better to allow selective parts of the data message to be transmitted and filter out redundant data. Thus, the host computer system can transmit all of the data that has changed from a previous data, while reducing the amount of communication bandwidth that is consumed.

One example of such partial filtering is setting the parameters of a periodic haptic effect. In general such a message can set the magnitude, frequency, and phase values for the haptic effect. A first data message can communicate the magnitude, frequency and phase values. If a subsequent second data message is sent in which only the magnitude has changed, the other parameters (i.e., frequency and phase) do not have to be transmitted. In such a case, embodiments of the present invention can filter the second data such that only the magnitude parameter is transmitted in the second data message. As can be appreciated, the filter can structure the second message in a manner so that the haptic feedback interface device will understand which data is being transmitted and which data is omitted, so that the haptic feedback interface device knows that the "smaller" second data message was not corrupted.

In the embodiments where there is a high bandwidth communication link between the host computer system and a haptic feedback interface device that has a low processing power, it may be possible to filter the data on the haptic feedback interface device after it has been transmitted over the high bandwidth communication link. In such a case, the host computer system can transfer all or some of the data that is requested by the haptic feedback interface device.

In some embodiments, a first data filter can be incorporated in the host computer system to filter identical data messages, and a second data filter can be incorporated in the haptic feedback interface device to filter data messages that are determined to by the second filter to be substantially identical from a haptic perspective. Such embodiments reduce the need for the data filter on the host computer system to be aware of what is "substantially similar" for the particular haptic feedback interface device.

Another situation where such an approach may be useful is where the host computer system is configured to handle an older haptic feedback interface device. An example of this would be a Microsoft Xbox or Sony Playstation game that was designed for an older, more capable haptic feedback interface device. In such a case, the code on the host computer system is usually not modifiable and an updated driver cannot be provided for the new host computer system or haptic feedback interface device. If the processing power of the newer haptic feedback interface device is decreased (as compared to the older haptic feedback interface device), then embodiments of the present invention can be used to filter out any data that would not affect the haptic sensations before the haptic feedback interface device does the processing on the data message.

Embodiments of the invention can include several categories or types of haptic feedback data or messages that can be received by the filter. The type can be implicit in the message itself (e.g. as the command identifier). For example, commands that control and effect the playback of haptic effects or halting of the playback, such as "start" or "stop" commands, can be used in embodiments of the present invention. A "start" message has an inherent type of "start" and a "stop" message has an inherent type of "stop." Other messages can be haptic effect definition messages, which can be transmitted to the haptic feedback interface device to modify a haptic effect that has been previously sent to the haptic feedback interface device and/or which is currently playing on the haptic feedback interface device. The parameters of these effects can be changed in real time, while the haptic effect is being played by the haptic feedback interface device (e.g., changing the frequency of a periodic effect while it plays to represent a change in speed of an automobile in a racing simulation). For example, a periodic force message can change the frequency of a periodic effect that is currently being played on the haptic feedback interface device (which was previously commanded to be played). Haptic feedback messages to which this is appropriate include, but are not limited to, periodic force commands, constant force commands, spring force definitions, damping force definitions, etc. Each of these commands can have a type corresponding to its command type, where the parameters of the command specify the particular characteristics of that instance of the commanded sensation.

In some embodiments, filters of the present invention can simultaneously support multiple different haptic messages and different haptic message effects can be processed by the filters independently from each other. Thus, all data messages that are targeted to one haptic effect are filtered in one group. Any data messages that are targeted to a different haptic effect on the haptic interface device are handled in a different group, and there can be independent filtering for each haptic effect. For example, if there are two vibration effects on the haptic feedback interface device, then the first vibration parameter would be handled independently from the second vibration parameter. If the first vibration parameter is commanded and the host computer system transmits multiple messages to adjust the second vibration parameter before another data message to modify the first vibration parameter, none of the second vibration parameter data messages will have an effect on the filter processing for the first vibration parameter.

One skilled in the art will appreciate that "identical information" or "substantially-identical information" does not necessitate equating messages of identical or substantially-identical byte content; rather, this term implies that the first and second data will result in identical behavior or substantially-identical (e.g., output forces) on the haptic feedback interface device. For example, one message that commands a force magnitude of 50% is considered equal to a later message that commands a force magnitude of 50%, even if the later message also includes extraneous data irrelevant to force output, such as a time stamp or other identifying information. The driver program can access a memory on the host computer system or the haptic feedback interface device that stores the messages that were previously sent so that the comparison to the last message of that type can be made.

If the second data changes the magnitude of the haptic output by the haptic feedback interface device due to the first data, and the second data would cause a 0.5% change in haptic output to the user compared to the current settings of the haptic feedback interface device, embodiments of the method can determine whether that is a significant enough change to allow the data to be transmitted to the haptic feedback interface device. This can depend on the type of haptic feedback being output (tactile or kinesthetic), the type of haptic feedback interface device (joystick, gamepad, mouse, knob, etc.), the actuators used in the haptic feedback interface device, etc. Embodiments of the filter can use its knowledge of the haptic feedback interface device capabilities to determine if the changes in data are substantially identical. For example, if an upper limit of a vibration frequency that the haptic feedback interface device can generate is 25 Hz, then if the data adjusts the frequency from 30 Hz to 32 Hz, there would be no reason to send this data to the haptic feedback interface device, as both values would be limited to the 25 Hz limitation that is specific to that haptic feedback interface device. As another example, for a low-bandwidth haptic feedback interface device, a small change such as 0.5% is not likely to be significant enough to warrant clogging a queued communication link with the additional data. Consequently, embodiments of the method would filter out (e.g., throw away) the data before it is transmitted to the haptic feedback interface device. However, a parameter change of 15% in haptic force output would typically be significant enough to allow the second data to be transmitted to the haptic feedback interface device. If bandwidth is low, then a low filtering threshold can be implemented, where the received data is filtered out unless the user is very readily able to perceive the change in force output caused by the received data. Generally, the filter's primary criterion is whether the data change between the first data and second data will produce a noticeable effect on the haptic output to the user.

For example, in one implementation, in the case of an effect definition message, if any one of the parameters of the data has a value that has changed by more than 10% of its entire value range, then that is considered a "significant amount" and the data must be sent. It should be appreciated, that other thresholds (e.g., 5%. 8%, 20%, 100 millivolts, etc.) might be used. This applies to parameters that cover a range of values. For binary parameters (e.g., on/off, yes/no, etc.), any change is significant, so that if any change occurs, the data is sent to the haptic feedback interface device. Parameters can be evaluated on a case-by-case basis in order to establish what a significant amount of change is, but these guidelines can be used in general. Exceptions can be used as well. For example, a periodic force message may have a parameter defining the period of the desired periodic haptic sensation. A change of ⅓ of an octave (doubling of frequency) for the period parameter can be considered a significant amount. It should be appreciated however, that in other embodiments of the present invention, other values (e.g., less than approximately 10% of the entire range) can be considered an insignificant amount and can be filtered from delivery, accordingly.

Figure 3:
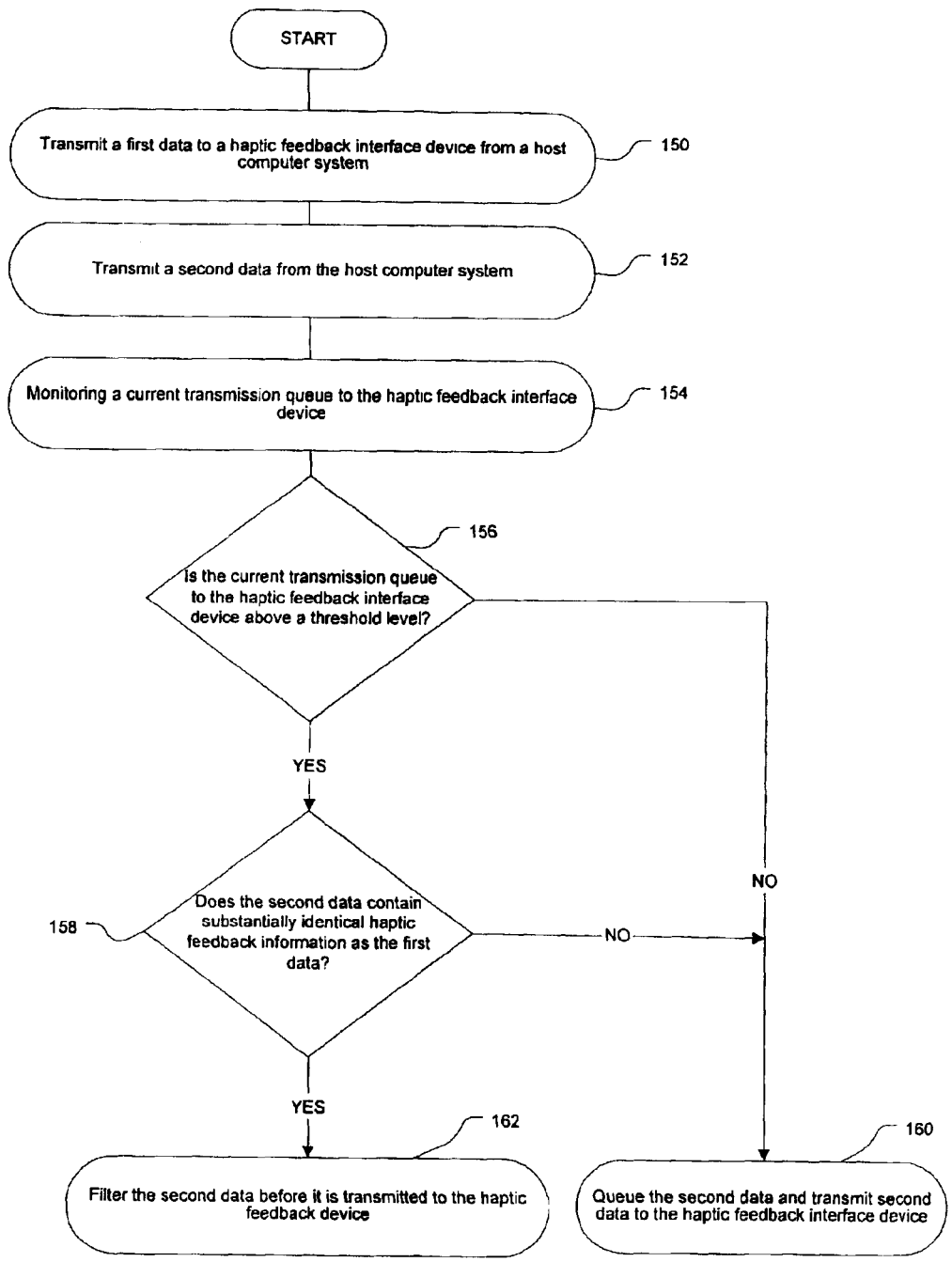
FIG. 3 is a flow diagram illustrating a method for filtering messages according to another embodiment of the present invention.

FIG. 3 is a flow diagram illustrating a method for filtering messages according to another embodiment of the present invention. At 150, a first haptic data (that typically includes haptic feedback parameters) is transmitted from the host computer system to the haptic feedback interface device. At 152, a second data (which also can include haptic feedback parameters) is transmitted after the first data. At step 154, a data traffic level to the haptic feedback interface device is monitored. At 156, it is determined if the current data transmission queue to the haptic feedback interface device is above a threshold level. If the current data transmission queue is below the threshold level, then at 160 the second data is transmitted to the haptic feedback interface. If, however, the current data traffic to the haptic feedback interface is above the threshold level, then at 158 it is determined if the second data contains substantially identical information as the first data.

If the first data and second data do not contain substantially identical information (e.g., there will not be a significant change in the haptic feedback to the user), then at 160 the second data is transmitted to the haptic feedback interface device. If, however, the first data and second data contain substantially identical information, then the second data is filtered (e.g., completely filtered, partially filtered, or the like) at 162 before it is transmitted to the haptic feedback interface device. If the second data is completely filtered, the filter acts as if the second data was queued for transmission to the haptic feedback interface device.

Figure 4:
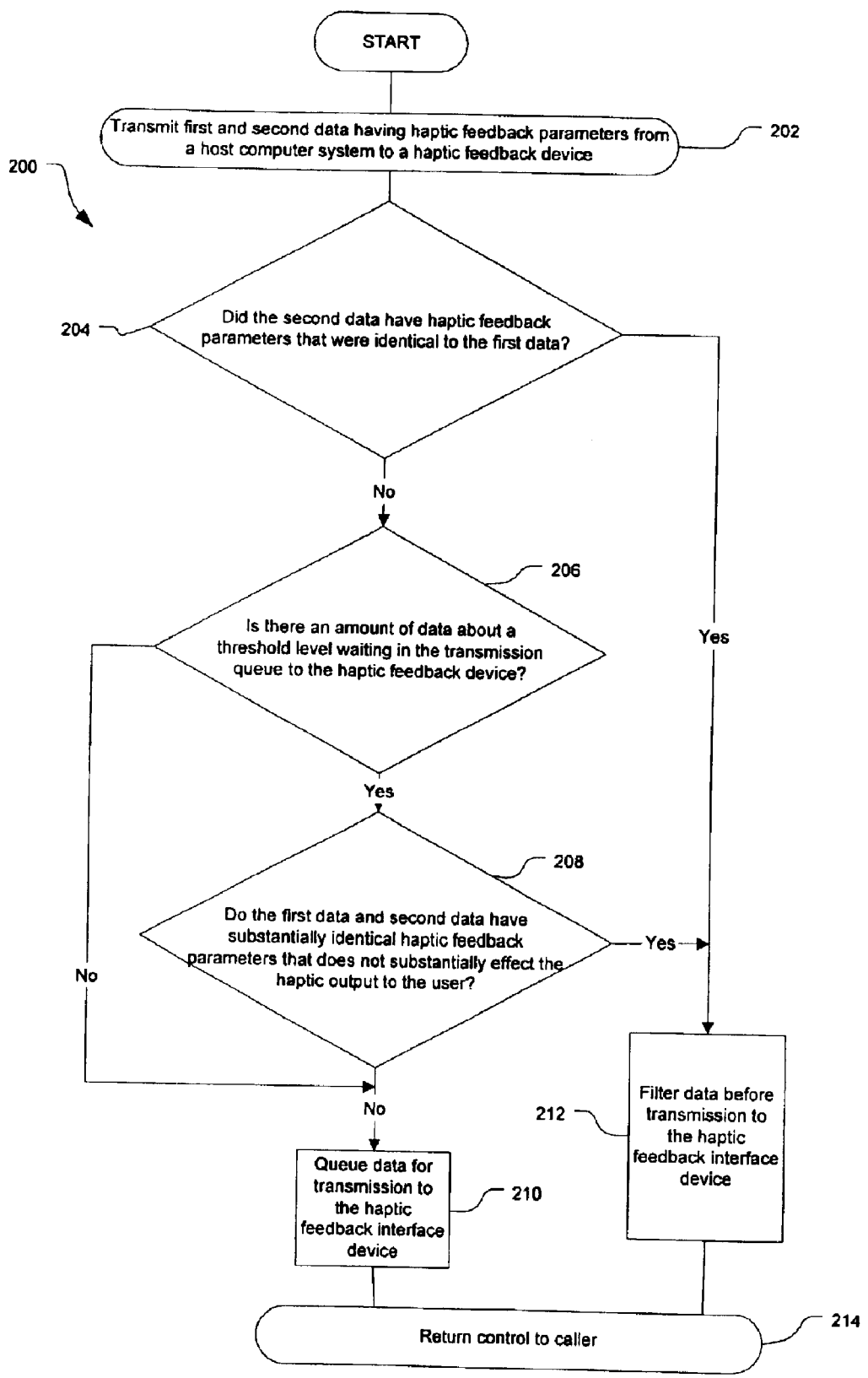
FIG. 4 is a flow diagram illustrating a method for filtering messages according to a further embodiment of the present invention.

FIG. 4 is a flow diagram illustrating a method for filtering data according to yet another embodiment of the present invention. At 202, a first data and a second data comprising haptic feedback parameters are transmitted from a host computer system. In one embodiment, the data includes haptic feedback data (which can be a command or other information). At 204, the second data having haptic feedback parameters is compared with first data (which is of the same or related type, e.g., haptic feedback data) to determine if the first data contains identical haptic feedback parameters as the incoming, second transmitted data. For ease of performance, if certain data in the second data and the first contain identical information, then the incoming second data is filtered 212 and at 214 returns control to the calling program. For example, if the second data is a command having parameters identical to command parameters previously received transmitted in the first data, then the redundant data is not transmitted. This can occur when a host application program that commands haptic effects updates effect parameters at a given frequency or interval, e.g., as a result of running a physics engine or other control loop. Typically, these application programs will not try to determine if the parameters of an effect need to be changed before sending the commands; it is easier, and less error-prone, to transmit to the haptic feedback interface device with computed effect parameter results without redundancy checks, even if identical information is provided to that which was last fed. Since many application programs are written this way, at 204 it can be important in reducing data traffic to the haptic feedback interface device, since the redundant data is filtered by the filters of the embodiments of the present invention. Consequently, bandwidth is saved.

If, however, the haptic feedback parameters in the second data are not identical to the first data of that same or related type, then at 206, the embodiments of the filter can monitor the current data transmission queue to the haptic feedback interface device to determine if the amount of data in the transmission queue is above a threshold level. If an amount of data waiting in the transmission queue is below the threshold level, then the filter proceeds normally to 210 and the second data is queued for transmission to the haptic feedback interface device. A threshold level of the filter will vary and can depend on, but is not limited to an expected bandwidth of the communication link versus the available bandwidth, the type of haptic feedback interface device, the processing speed of the local processor, or the like.

If it is determined at 206 that the amount of data in the transmission queue is above the threshold level, (e.g., if the communications channel is deemed to be too busy for the particular haptic feedback interface device), then at 208 embodiments of the filter can compare the haptic feedback parameters of the second data with the haptic feedback parameters of the first data to determine if the haptic feedback parameters have substantially identical haptic feedback parameters that will not substantially effect the haptic output to the user. Only data that do not have substantially identical haptic feedback parameters are transmitted to the haptic feedback interface device. Again, a memory can store the previously-transmitted data. To perform this adequately, the driver software (or whatever software/hardware configuration is being used) can have some knowledge of the capabilities of the haptic feedback interface device.

If any haptic feedback parameters of the second data are not substantially identical to the haptic feedback parameters of the first data, embodiments of the method proceeds to 210 to add the second data to the data transmission queue to the haptic feedback interface device, and control to the calling program would be returned at 214. If the haptic feedback parameters are substantially identical, then 212 is performed, where the second data is filtered (e.g., partially filtered, not transmitted to the haptic feedback interface device, or the like), and the calling program or driver can act as if the second data had been queued for transmission to the haptic feedback interface device. Control is then returned to the caller at 214.

In some cases, "time" may come into play with the filter. In one case, some applications can send haptic effects with a short duration that are updated frequently. This may limit the haptic output on the haptic feedback interface device in the case when there is a problem with the application running on the host computer system. If the host computer system is somehow locked up, then the haptic feedback interface device will generate haptic output to the user until the duration of the haptic effect has expired. If there were several identical updates sent to the haptic feedback interface device, it would not be desirable to send all of the data since such data could overload the communication link. However, even though all for the updates are identical, the filter can ensure that the haptic feedback interface device is being updated often enough to ensure that the haptic effect keeps playing.

In another case, the duration information of the haptic feedback data can be used for a different purpose. For example, if many data messages are sent rapidly to the haptic feedback interface device, then a queue of messages may grow on the host computer system. Since the messages are being delayed on the way to the haptic feedback interface device, there is a corresponding lag in the haptic output that is generated. In such cases, some embodiments of the filter can selectively filter data to prevent the queue from being noticeable to the user from a haptic sense.

While this invention has been described in terms of several preferred embodiments, it is contemplated that alterations, permutations and equivalents thereof will become apparent to those skilled in the art upon a reading of the specification and study of the drawings. For example, many of the features described in one embodiment can be used interchangeably with other embodiments. Also, it should be appreciated, that many different types of haptic feedback interface devices and haptic sensations can be used with the present invention. Furthermore, certain terminology has been used for the purposes of descriptive clarity, and not to limit the present invention.

What is claimed is:

1. A method of filtering data, the method comprising:
   transmitting a first data comprising haptic feedback parameters before transmitting a second data comprising haptic feedback parameters;
   determining whether the second data contains substantially identical haptic feedback parameters as the first data; and
   filtering the second data on a determination that the second data has substantially identical haptic feedback parameters as the first data.

2. The method of claim 1 wherein filtering the second data is carried out before the second data is transmitted from a host computer system over a communication link to a haptic feedback interface device.

3. The method of claim 1 wherein filtering the second data is carried out after the second data is transmitted from a host computer system over a communication link to a haptic feedback interface device.

4. The method of claim 1 wherein determining whether the second data contains substantially identical haptic feedback parameters as the first data comprises:
   determining whether the haptic feedback parameter of the second data are within a predetermined percentile difference from the haptic feedback parameter of the first data, and
   upon determining that the second data is within the predetermined percentile difference, maintaining a haptic feedback output of the first data.

5. The method of claim 1 comprising:
   monitoring a data transmission queue from a host computer system to a haptic feedback interface device; and
   queuing the second data if the amount of data waiting in the data transmission queue is below a threshold level, even if the second data has substantially identical haptic feedback parameters as the first data.

6. The method of claim 5 wherein the threshold level depends on an expected bandwidth of a communication link between the host computer system and the haptic feedback interface device.

7. The method of claim 1 wherein filtering the second data comprises:
   preventing the second data from being transmitted to a haptic feedback interface device; and
   simulating successful queuing of the second data in a transmission queue to the haptic feedback interface device.

8. The method of claim 1 wherein filtering the second data comprises:
   dropping information from the second data that is redundant from the first data; and
   transmitting information from the second data that is not redundant from the first data.

9. A computer usable medium having computer readable program code embodied in the computer usable medium, said computer readable program code comprising:
   code for transmitting a first data comprising haptic feedback parameters before transmitting a second data comprising haptic feedback parameters;
   code for determining whether the second data contains substantially identical haptic feedback parameters as the first data; and code for filtering the second data on the determination that the second data has substantially identical haptic feedback parameters as the first data.

10. The computer usable medium of claim 9 wherein the computer usable medium is stored in a memory on a host computer system and is processed by a processor on the host computer system.

11. The computer usable medium of claim 9 wherein the computer usable medium is stored in a local memory on a haptic feedback interface device and is processed by a local processor coupled to the haptic feedback interface device.

12. The computer usable medium of claim 9 further comprising code for monitoring a queue between a host computer system and a haptic feedback interface device coupled to the host computer system,
    wherein the code for filtering is further configured to transmit the second data even if the second data has substantially identical haptic feedback parameters as the first data, upon the determination that the queue between the host computer system and haptic feedback interface device is below a threshold level.

13. The computer usable medium of claim 9 wherein the code for determining whether the second data contains substantially identical haptic feedback parameters as the first data is further programmed to determine whether the haptic feedback parameter of the second data is within a predetermined percentile difference as compared to the haptic feedback parameter of the first data.

14. The computer usable medium of claim 9 wherein the code for filtering the second data is further configured to prevent transmission of the second data and to simulate successful queuing of the second data in a transmission queue to a haptic feedback interface device.

15. The computer usable medium of claim 9 wherein the code for filtering the second data is configured to filter information from the second data that is redundant from the first data and to transmit information from the second data that is not redundant from the first data.

16. A haptic feedback system for filtering data, the system comprising:
    a host computer system for transmitting a first data and a second data that comprise haptic feedback parameters;
    a haptic feedback interface device coupled to the host computer system and configured to receive the first data and second data from the host computer system,
    wherein the host computer system is configured to determine whether the second data contains substantially identical haptic feedback parameters as the first data and filtering the second data to the haptic feedback interface device on the determination that the second data has substantially identical haptic feedback parameters as the first data.

17. The haptic feedback system of claim 16 wherein filtering the second data comprises preventing transmission of the second data.

18. The haptic feedback system of claim 16 wherein filtering comprises preventing transmission of information from the second data that is redundant from the first data and transmitting information from the second data that is not redundant from the first data.

19. The haptic feedback system of claim 16 wherein the host computer system is further configured to monitor an amount of data in a transmission queue to the haptic feedback interface device and allow the second data to enter the transmission queue if there is less than a threshold level of data in the transmission queue, even if the first data and second data have substantially identical haptic feedback parameters.

20. The haptic feedback system of claim 19 wherein the threshold level of data is dependent on at least one of a processing power of the haptic feedback interface device and a bandwidth of a communication link between the host computer system and the haptic feedback interface device.

21. The haptic feedback system of claim 16 wherein the host computer system determines whether the second data contains substantially identical haptic feedback parameters as the first data by determining whether the haptic feedback parameters of the second data is within a predetermined percentile difference from the haptic feedback parameters of the first data.

22. A method of filtering data, the method comprising:
    monitoring a transmission queue between a host computer system and a haptic feedback interface device; and
    filtering a second data that contains substantially identical haptic feedback parameters as a previously transmitted first data on the determination that the amount of data in the transmission queue between the host computer system and the haptic feedback interface device is above a threshold level.

23. The method of claim 22 wherein filtering the second data is carried out before the second data is transmitted from the host computer system over a communication link to the haptic feedback interface device.

24. The method of claim 22 wherein the threshold level depends on at least one of a processing power of the haptic feedback interface device and an expected bandwidth of a communication link between the host computer system and the haptic feedback interface device.

25. The method of claim 22 comprising queuing the second data in the transmission queue on the determination that the transmission queue is below the threshold level.

26. A computer usable medium having computer readable program code embodied in the computer usable medium, said computer readable program code comprising:
    code for monitoring a transmission queue between a host computer system and a haptic feedback interface device; and
    code for filtering a second data that contains substantially identical haptic feedback parameters as a previously transmitted first data on the determination that the amount of data in the transmission queue between the host computer system and the haptic feedback interface device is above a threshold level.

27. The computer usable medium of claim 26 wherein the threshold level depends on at least one of a processing power of the haptic feedback interface device and an expected bandwidth of a communication link between the host computer system and the haptic feedback interface device.

28. The computer usable medium of claim 26 comprising code for queuing the second data on the determination that the transmission queue is below the threshold level.

29. A haptic feedback system for filtering data, the system comprising:
    a host computer system for transmitting a first data and a second data that comprise haptic feedback parameters;
    a haptic feedback interface device coupled to the host computer system and configured to receive data from the host computer system,
    wherein the host computer system is configured monitor a transmission queue between a host computer system and a haptic feedback interface device and filter a second data that contains substantially identical haptic feedback parameters as a previously transmitted first data on the determination that the amount of data in the transmission queue between the host computer system and the haptic feedback interface device is above a threshold level.

30. The haptic feedback system of claim 29 further comprising a communication link coupling the host computer system to the haptic feedback interface device, wherein the threshold level is dependent on at least one of a processing power of the haptic feedback interface device and a bandwidth of the communication link between the host computer system and the haptic feedback interface device.

* * * * *